United States Patent [19]

Trost et al.

[11] Patent Number: 4,627,018

[45] Date of Patent: Dec. 2, 1986

[54] PRIORITY REQUESTOR ACCELERATOR

[75] Inventors: John R. Trost, Anoka; Daniel K. Zenk, Stillwater, both of Minn.

[73] Assignee: Sperry Corporation, New York, N.Y.

[21] Appl. No.: 530,285

[22] Filed: Sep. 8, 1983

[51] Int. Cl.[4] ............................................ G06F 13/18
[52] U.S. Cl. ................................................. 364/900
[58] Field of Search ... 364/200 MS File, 900 MS File

[56] References Cited

U.S. PATENT DOCUMENTS

| | | | |
|---|---|---|---|
| 3,543,242 | 11/1970 | Adams, Jr. et al. | 364/200 |
| 4,085,444 | 4/1978 | Schneider | 364/900 |
| 4,090,238 | 5/1978 | Russo | 364/200 |
| 4,400,771 | 8/1983 | Suzuki et al. | 364/200 |
| 4,415,972 | 11/1983 | Adcock | 364/200 |
| 4,449,183 | 5/1984 | Flahive et al. | 364/200 |
| 4,493,036 | 1/1985 | Boudreau et al. | 364/200 |
| 4,509,140 | 4/1985 | Cheung | 364/900 |

Primary Examiner—David Y. Eng
Assistant Examiner—Thomas C. Lee

Attorney, Agent, or Firm—Charles A. Johnson; Kenneth T. Grace; Marshall M. Truex

[57] ABSTRACT

A system for accelerating the granting of prioritized memory requests to a multi port memory system of a data processing system is disclosed. The priority requestor accelerator system detects the fact that one remaining requestor is in the priority memory system. The priority system logic is cleared out before the end of the normal requestor cycle. This allows the acceptance of a new set of requestors to be presented to the priority circuits at that time rather than waiting until presentation of the final request. Thus, the accelerator detects that the requestors from a previous requesting snap are on their last cycle. This allows a preclearance of the lower ranks as the priority circuit finishes its last cycle. The new requests are then loaded and the priority inputs are snapped shut beginning a new set of cycles. The overall operation happens as if the priority circuit is just moving from one requestor to another that is already in residence after the snap. Without this acceleration, a full memory cycle would have been lost with each reloading of the priority register.

6 Claims, 12 Drawing Figures

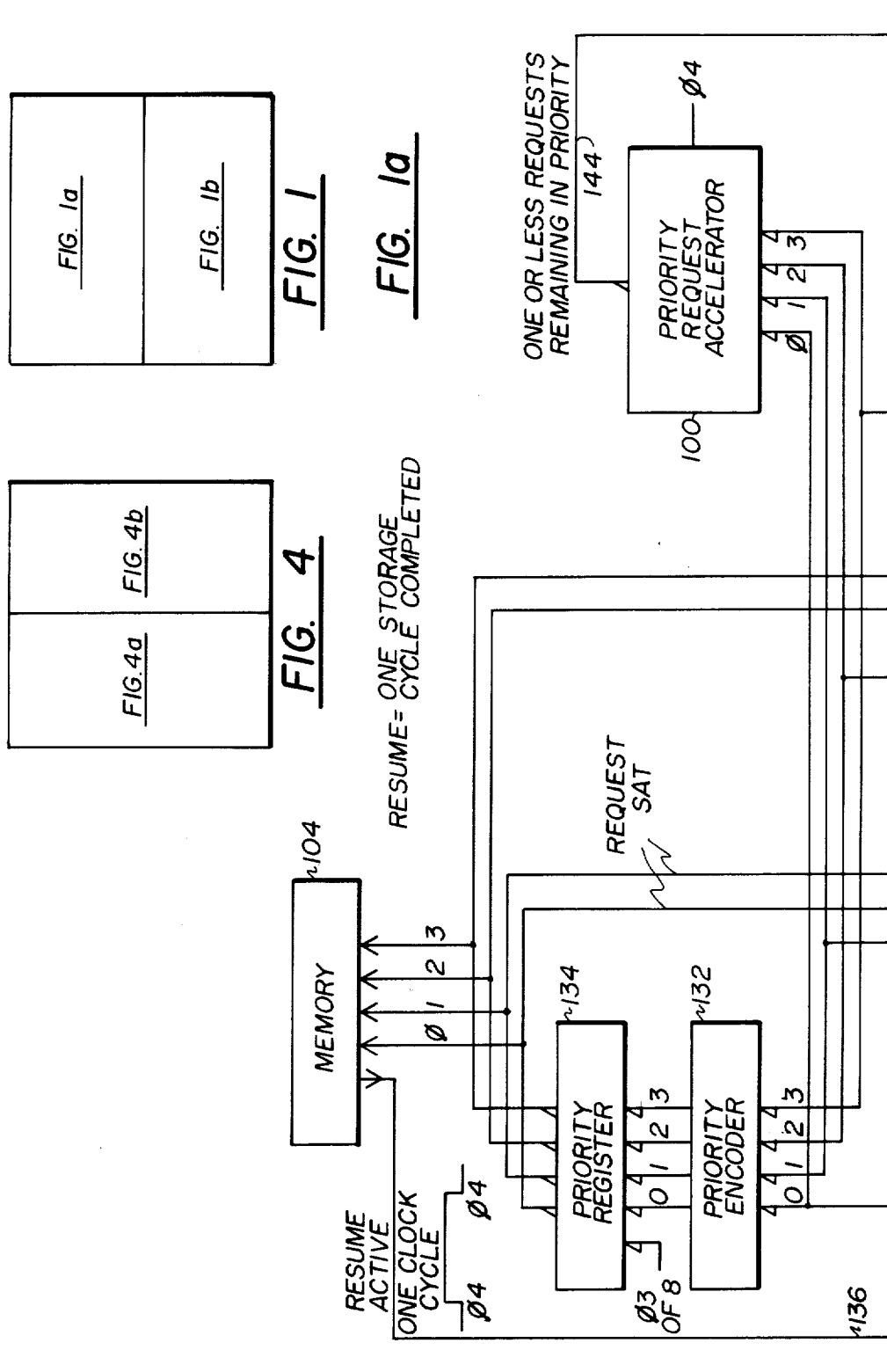

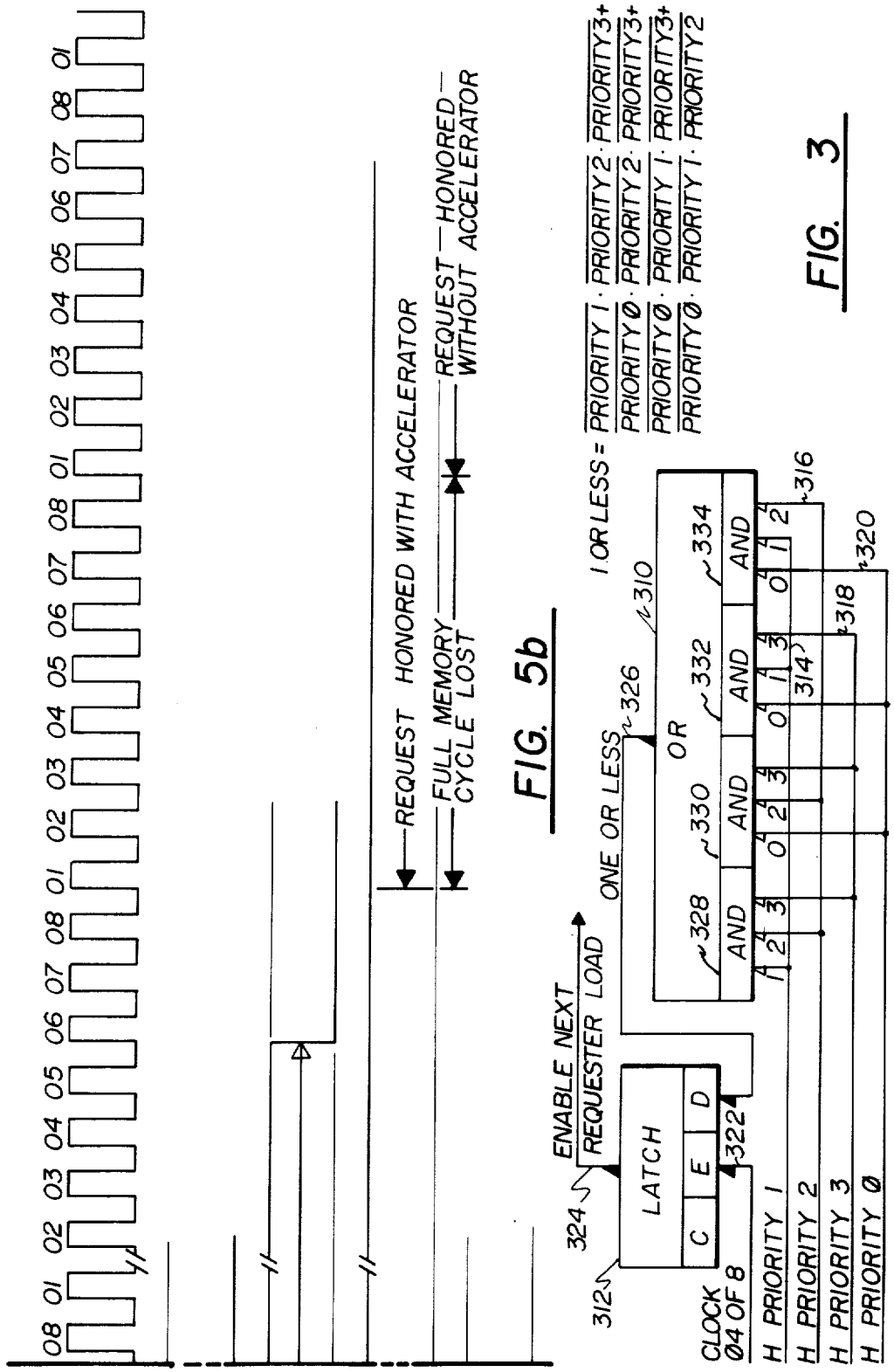

| 0 IN | 1 IN | 2 IN | 3 IN | PRIORITY ON (X) |
|---|---|---|---|---|
| H | | | | H |
| | H | | | H |
| | | H | | H |
| | | | H | H |
| L | L | L | L | L |

PRIORITY ENCODER 418
TRUTH TABLE

PRIORITY REQUESTOR ACCELERATOR

BACKGROUND OF THE INVENTION

A. Field of the Invention

This invention relates to priority circuits used in conjunction with memory access systems. More particularly, it relates to those memory systems having multiport access capabilities wherein priority logic circuits are used to determine the sequential order in which requests have been presented.

B. Prior Art

In the past, priority circuits have been used to determine the sequential order which requestors have been accepted without conflict. Thus, as each memory request was made, earlier priority circuits merely placed them in the sequential order in which they were received so that they gained memory access in the same sequence in which the requests were made. Further, these request signals were temporarily stored in a register from which they were individually serviced as a memory port became available. The priority request register then was first filled with requests for memory and thereafter emptied in sequence until the last request was handled. At that time, the register was refilled and the sequence was repeated. However, as memory speed was increased, it soon became apparent that a relatively substantial amount of time was wasted between the granting of the last request of the previous group and the first request in the next group refill. Thus, no memory requests were being handled as the register was being refilled with the next group of request signals. In the present instance, this time gap was unacceptable.

BRIEF DESCRIPTION OF THE INVENTION

A. Objects

Accordingly, it is an object of the present invention to provide an improved priority request mechanism.

It is also an object of the present invention to provide an improved priority request system which eliminates the time gap between the servicing of the last request in one group of memory requests and the servicing of the first request in the next memory request group.

It is another object of the present invention to provide an improved memory request system which allows a higher rate of throughput in a multiport memory system by a faster means of priority requestor presentation.

It is a still further object of the present invention to provide an improved memory request system in which the normal priority circuits are conditioned to accept the next set of memory request at a faster rate.

It is also an object of the present invention to provide an improved memory request system in which an accelerator circuit detects the fact that the priority logic is processing the last requestor instead of waiting for all of the requestors to be processed.

It is still another object of the present invention to provide an improved memory request system in which a priority requestor accelerator circuit detects the fact that the previous group of requestors is one request from finishing and alerts the next group of memory requests to be transferred to the priority memory request register during the same clock time as the last request of the former memory request group is being satisfied.

B. Summary of the Invention

A priority requestor accelerator system is disclosed which detects the fact that there is one remaining request in the memory priority system. The priority logic is cleared out before the requestor logic would normally be activated to receive the next group of memory requests. This allows the acceptance of a new set of requestors to be presented to the priority circuits at the normal switching time. Without this system a time delay was necessitated because presentation and clearing could not occur simultaneously. This priority requestor accelerator system detects the fact that the requestors from a previous requesting group are on their last cycle. The system then allows a preclearing of the lower rank as the priority sequence finishes the last cycle. The new requestors are loaded and the priority input circuits are snapped shut beginning a new set of cycles. Operatively, there is a smooth transition between groups of request signals. As one set concludes, the new set is initiated, with interim time between sets being equal to the interim time between requests.

BRIEF DESCRIPTION OF THE DRAWINGS

FIG. 1 includes FIGS. 1A and 1B is a priority logic block diagram showing in generalized form, an overall memory request system with the additional priority request accelerator positioned as suggested by the present preferred embodiment.

FIG. 3 is a detailed logic diagram showing the overall OR gate with four input requests entering a group of four AND gates to produce a one or less output signal.

FIGS. 5a and 5b, is a timing diagram showing when the requests are honored with and without the priority requestor accelerator.

FIG. 6 illustrates a truth table of the priority encoder shown in FIG. 4a.

DETAILED DESCRIPTION OF THE PREFERRED EMBODIMENT OF THE INVENTION

Figure 1B:
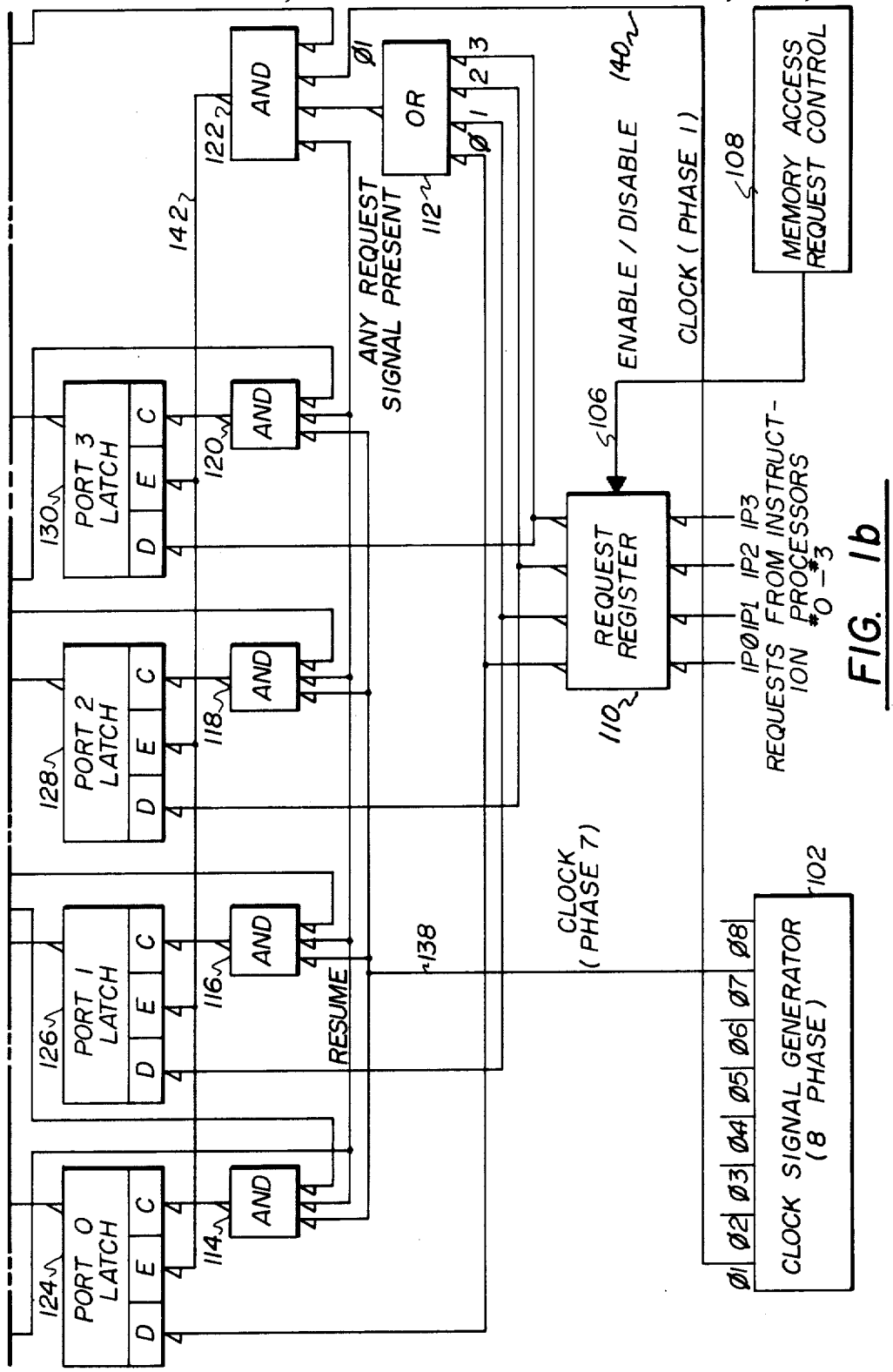

In a consideration of the detail logic, cirucit conventions will be followed. A logical "1" will be the equivalent of a High signal, and a logical "0" will be the equivalent of a Low signal. The basic logic symbols are conventional, and represent circuits that will accomplish the logical functions represented. Certain of the logical functions will be depicted in block logic diagram symbols that will define higher ordered or combinations of logic functions. The basic logical operations comprising AND, OR or Inversion, and the like will be first described.

In the logic block diagram symbology, an open half-arrow head represents that the logic block is responsive to a Low signal. Similarly, a filled half-arrow head represents that the logic block is responsive to High signals. The same convention applies at the output, where the open half-arrow head indicates a Low output signal will result when prescribed input conditions are satisfied. Similarly, the closed or filled half-arrow head at the output is indicative that a High output signal will result when the input conditions are satisfied. In the logic block diagram symbology, which will be described for specific combinations below, it must be recognized that several functions may be accomplished with the logic block. The logic block symbol can represent circuitry that provides both the resultant output and its complement in the same manner as that described above. Accordingly, a block diagram symbol designated AND, having open half-arrow head inputs is a Low AND, the equivalent of a High OR. An AND having closed half-arrow head inputs is a High AND.

The symbols designated OR represent circuits that perform the logical OR function. The closed half-arrow head inputs to an OR symbol indicates that the symbol performs the OR function on High signals, resulting in a High output signal when any or all of the input signals are High. The open half-arrow head at the output portion of the symbol indicates the inverse of the condition that satisfies the logical function. For example, if the High OR circuit receives a High input signal, the open half-arrow output will provide Low signal. When the OR symbol has open half-arrow input lines, the logical function is that of providing the OR function of Low signals, the equivalent of High AND, and operations that are similar to that just described.

The logical operation of Latch circuits, such as D Latches, is such that an input signal applied on the D input terminal, when appropriately enabled by a clock signal or other enabling signal, will cause the Latch circuit to be switched to the state indicated by the input signal. Characteristically, the Latch circuit provides both true and complement output signals indicative of the state of the input signal. Latch circuits are welll known and are available commercially and a detailed description of the electrical operation of the Latch circuit is not necessary. It should be noted, however, that a latch cirucit may also be referred to herein as a flip-flop circuit, even though there is a slight operational difference. Strictly speaking, a flip flop operates on clock signal edges, whereas a latch circuit operates on the entire clock pulse. In any event, the terms, as used herein, are considered interchangeable.

With particular reference to FIG. 1, there is shown a priority logic block diagram incorporating the present invention. Starting at the lower portion of FIG. 1, a group of four memory requests, one from each of a plurality of four instruction processors IP0, IP1, IP2 and IP3 are asynchronously received and temporarily stored in register 110. The presence of these signals (less than all four may be received during any memory request cycle) in the request register 110, is immediately transmitted to the four latches 124, 126, 128 and 130 and to OR gate 112. These four latch circuits are illustrated as PORT ØFF; PORT 1FF, PORT 2FF and PORT 3FF. Each of these circuits has an input D terminal; an enable signal input line E and a clear input signal line C. As previously noted, an input signal applied on the D input terminal, when appropriately enabled by an enabling signal on the E input terminal will cause the latch circuit to be switched to the state indicated by the D input signal. This state is denoted by an output signal from each of the latches 124, 126, 128 and 130 which is sent to the priority encoder 132 and the priority request accelator 100, which is the subject of this invention and will now be described.

For the purpose of this description of FIG. 1, suffice it to say that accelerator 100 will provide an output signal on line 144 to AND gate 122. The priority encoder 132 provides the encoded output signals which are sent to and stored by priority register 134. As the timing cycle continues through the eight phases ($\phi 1$ through $\phi 8$) of the clock, the priority register at $\phi 3$ of the clock will sequentially provide output signals which are returned to a group of AND gates 114, 116, 118 and 120. Each of these AND gates also receive two other input signals 136 and 138. Resume signal 136, which indicates that one storage cycle is completed, is present during the last clock cycle of the request cycle. Further, signal 138 is present at phase seven ($\phi 7$) of the clock. When these two signals and one of the output signals from the priority register 134 are simultaneously present at any of the AND gates 114, 116, 118 and 120 the individual AND gate will clear its corresponding latch. This sequence will continue until all of the requests have been honored. In the past, there has existed a time delay which occurred between the honoring of the last request and the start of a new set of cycle of requests. In the present instance, however, there exists an additional accelerator mechanism 100.

This priority network of FIG. 1 operates generally in the following manner. The presense of any request signal is presented to the AND gate 122 via the OR gate 112. In addition, the last cycle of the request cycle signal 136 is also applied to AND gate 122. When one or less requests remain to be honored in the priority register 134, a signal indicating this condition is applied to the AND gate 122. Finally, when the next $\phi 1$ of the eight phase clock is present on line 140 the AND gate 122 provides an output enabling signal on line 142 to each of the four PORT latches causing them to be switched and therefore ready to receive a new set of requests. This readiness to accept a new set of requests is therefore occurring when one request of the last batch still remains in the Priority Register 134. This overlapping of operation allows the first request of the new request batch to be honored on the $\phi 1$ clock signal of the following clock sequence.

Figure 2:
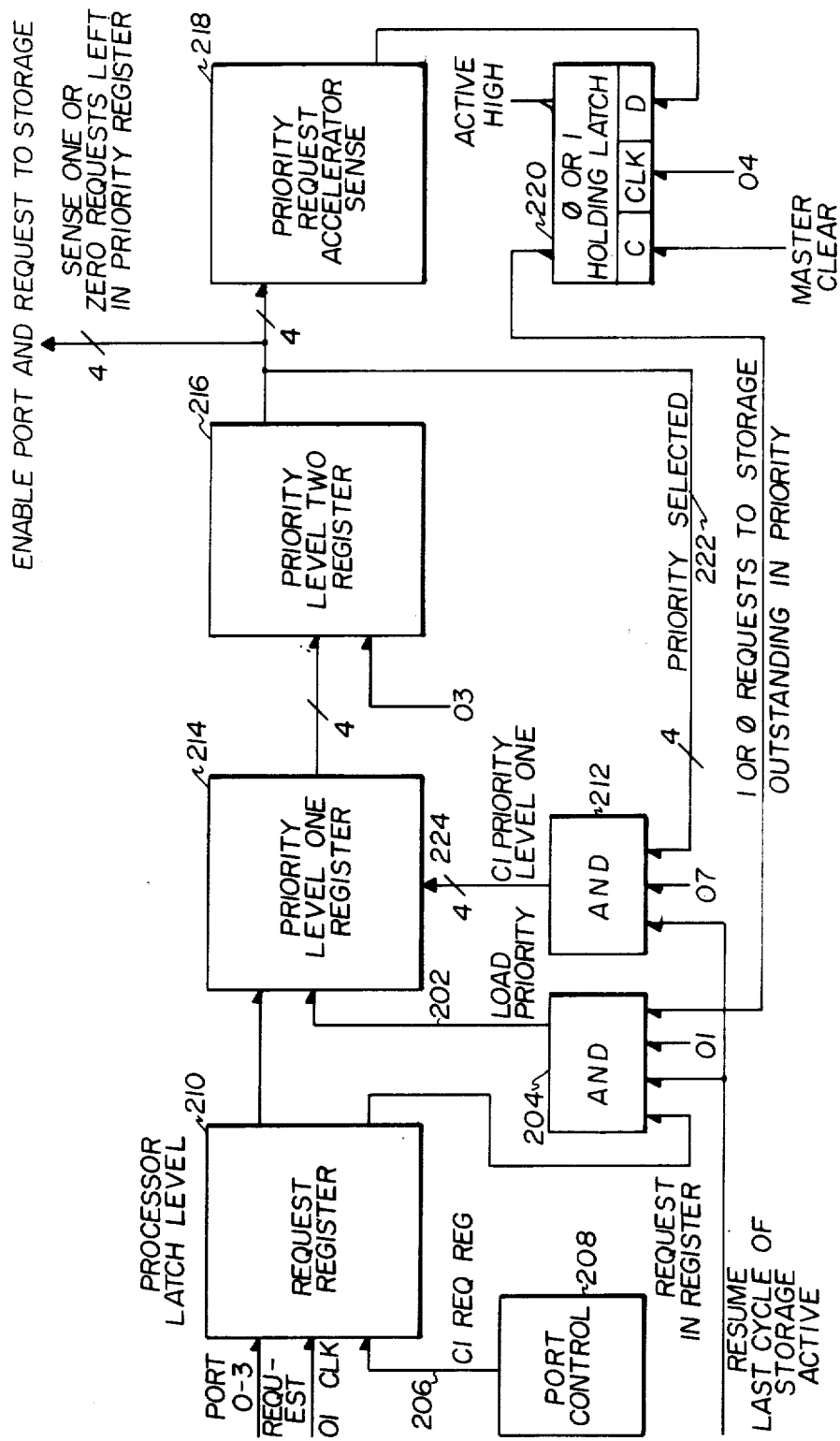
FIG. 2 is also a logical block diagram illustrating the various levels of priority, as well as the single request sense level and the processor latch level.

Referring next to FIG. 2, there is shown in greater detail the elements of the priority request accelerator. The PORT latch level circuit 210 receives the four requests IPØ–IP3 under control of the PORT control 208. It latches and holds this combination of requests. The first priority level circuit 214 announces to the priority second level 216 which PORT is currently being honored. The output signal 222, along with the last clock cycle of the request cycle (identified herein as the resume signal) AND $\phi 7$ clears the Priority Level 1 Register latch level 214 via signal 224. The load priority signal 202 emanates from AND gate 204 when the four signals illustrated are present.

The one request sense level circuit 218 announces via an active high signal 226 to the accelator level circuit 220 when the last held IP request is curently honored. Only during the last clock cycle of the last held request cycle will the accelerator disable its active high signal (i.e., it goes low on $\phi 4$ of the eight phase clock). A new combination of IP requests will be latched and held in the Priority Level 1 register circuit 214 on the $\phi 1$ clock pulse on the following cycle. The clear Priority Level One signal 224 allows respective clearing of the requests being honored in the Priority level One Register 214.

FIG. 3 illustrates a detailed logic diagram of the priority accelerator circuit. The priority selection is performed by a plurality of AND gates 328, 330, 332, and 334 in conjunction with an OR gate 310. Thus, to obtain the necessary one or less request signal it is required to perform the following logical sequence. First, the reciprocals (i.e. H) of the priority 1 signal 314, the priority 2 signal 316 and the priority 3 signal 318 are combined in AND gate 328. Next, the priority $\phi$ signal 320, the priority 2 signal 316, and the priority 3 signal 318 are combined in AND gate 330. Then, the priority $\phi$ signal 320, the priority 1 signal 314 and the priority 3 signal 318 are combined in AND gate 332. Finally, the priority $\phi$ signal 320, the priority 1 signal 314, and the priority 2 signal 316 are combined in AND gate 334. The outputs of these four AND gates 328, 330, 332 and 334 are thereafter joined together in OR gate 310 to produce the one or less output signal 326. This denotes that one AND condition has been satisfied which indicates that three of the four priority latches are in a cleared state. The presence of the one or less signal 326 causes the flip flop 312 to be enabled via input D to produce an output signal 324 which enables the next requestor load to be entered.

Figure 4A:
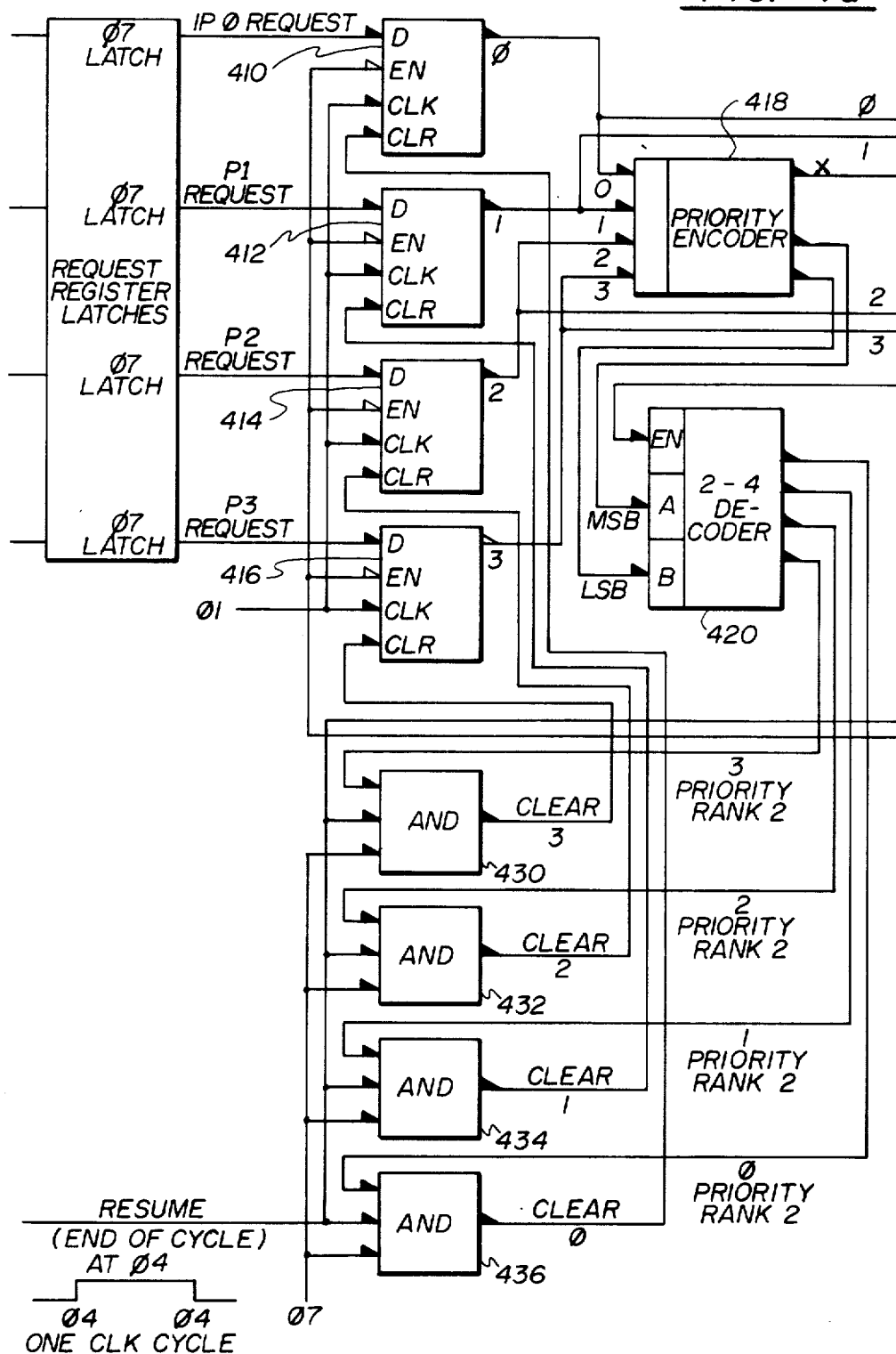
FIG. 4 includes FIGS. 4a and 4b positioned as shown, and is a detailed logic diagram of the overall priority system with the four instruction processors (IP) requesting access via the priority requestor circuit with the priority requestor accelerator interconnected in the preferred manner.
Figures 4B, 6:
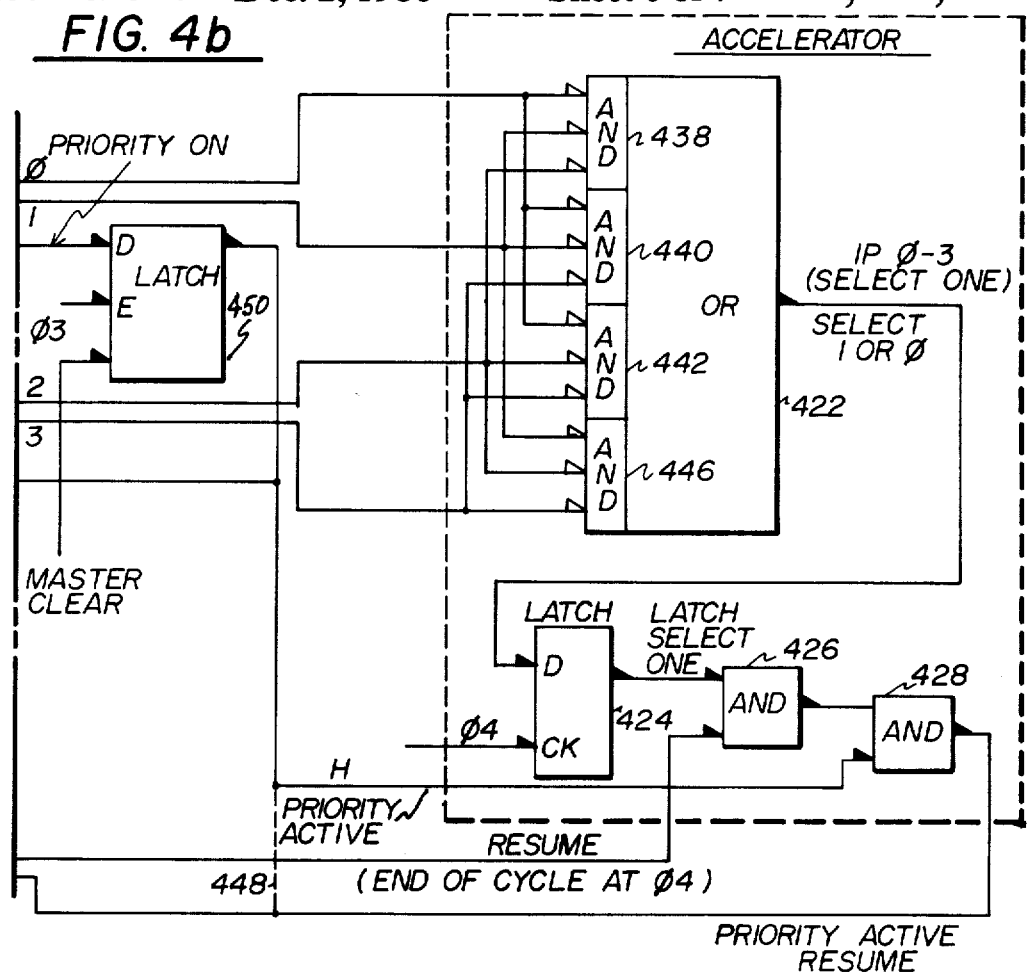
Figure 5A:
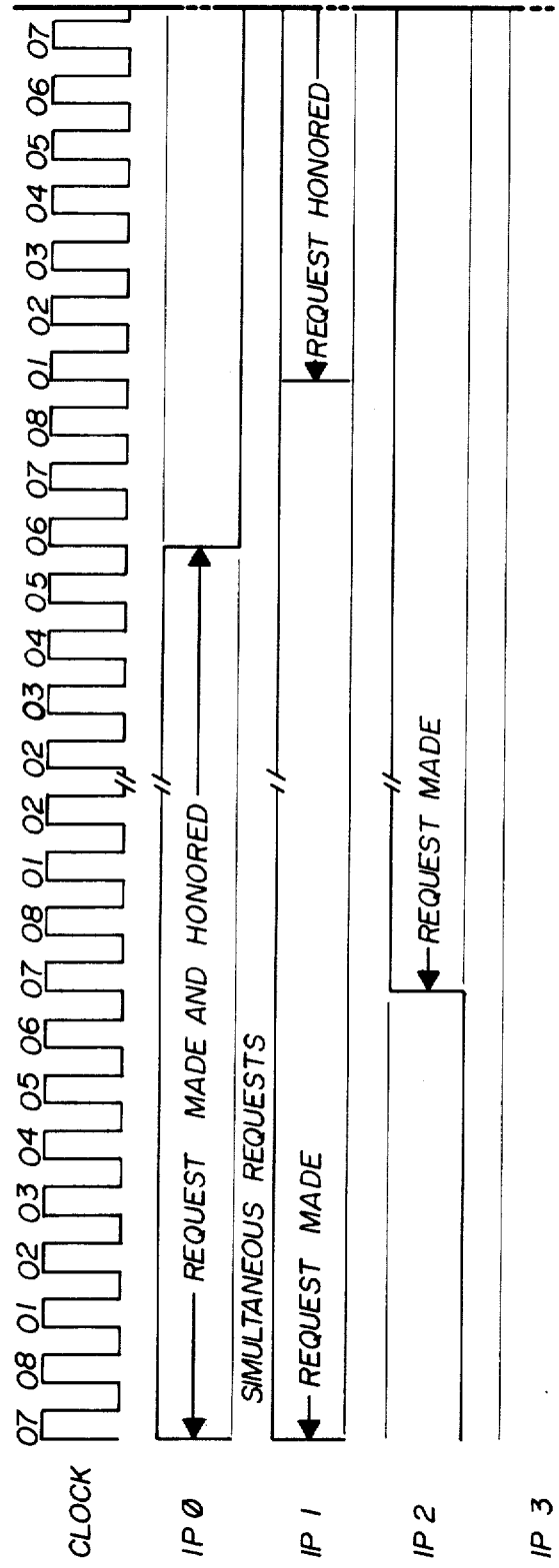
Figure 5:
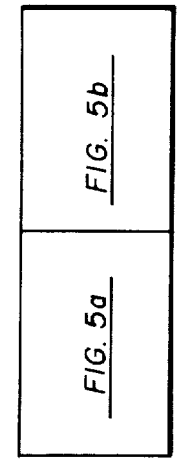
FIG. 5, which includes

FIG. 4 includes FIGS. 4a and 4b positioned as illustrated. A group of four latching circuits 410, 412, 414 and 416 receive the next group of requests from the request register latches. These signals arrive as a group of memory requests and once they are received, the latching circuits are disabled (D) and are no longer capable of receiving requests until the next group of requests are received via an enabling and clearing operation. In prior systems, this enabling and clearing did not become operative until the last request had been granted (honored). Thus, new requests were not received until all requests presently latched were honored. The granting of the requests presently in the latching circuits 410, 412, 414 and 416 are accomplished in a prioritized manner. Thus, a priority order is placed on the request by the priority encoding circuit 418. It is not considered necessary to the description of this invention to explain in any detail, this priority encoder mechanism 418, since such circuits are well-known to those skilled in the art, and they are not required for an understanding of the present inventive concept.

Similarly, the decoding means 420 is simply a device to decode the encoding operation previously accomplished by the encoder 418. Suffice it to say that a two bit priority encoding system is transformed into four bits when the decoding of the signal is performed. As previously noted, such decoder devices are well-known to those skilled in the art and further, this decoding operation does not contribute in any way to an understanding of this inventive description. The use of these decoded signals, however, 0, 1, 2, and 3 from decoder 420 are respectively sent to a group of four AND gates 430, 432, 434, and 436. Each of these AND gates is a three input device which is operative upon the simultaneous presence of three input signals. Thus, any time all three signals, namely, a decoded signal from decoder 420; a $\phi$7 clock signal (phase seven of an eight phase clock); and an L IP Resume signal (end of cycle at phase 1) are present at the inputs of the AND gates, a clear signal is sent from its output terminal. These four clear signals are returned to the clear input terminals of the latching circuits 410, 412, 414 and 416.

A Priority On (X) output from the priority encoder 418 is sent to another latch circuit 450. From this latch circuit 450, an output is sent to enable the decoder circuit 420 and also a signal (priority active) is sent to AND gate 428 of the accelerator (enclosed in dashed lines.) Note there that without this accelerator (that is, as previously constructed) this signal was sent via the dashed connection line 448 to the enabling terminals of the input latching circuits 410, 412, 414 and 416. In the present configuration, however, this dashed line is non-existent and the output terminal of AND gate 428, noted as the priority active signal, is returned to the enabling terminals of the four latching circuits 410, 412, 414 and 416.

The accelerator circuit commonly receives the same input signals as the priority encoder 418. Input signal $\phi$ is sent to AND gates 438, 440 and 442; input signal 1 is sent to AND gates 438, 440 and 446; input signal 2 is sent to AND gates 438, 442 and 446; and finally input signal 3 is sent to AND gate 440, 442 and 446. These four AND gates 438, 440, 442 and 446 and commonly coupled to the input of a common OR gate 422.

Next, OR gate 422 selects one of the inputs which indicates three of the four priority latches are cleared and transmits the signal to latch circuit 424. At phase four ($\phi$4) of the eight phase clock, the latch circuit 424 provides a high output signal to the AND gate 426. This AND gate 426 is triggered when it simultaneously receives this high output signal, the resume (end of cycle @$\phi$4) signal and the AND gate 426 provides an input signal to AND gate 428 where it provides the priority active Resume latch circuit clearing signal when the input signal priority active is also present at its input.

A priority encoder truth table is shown in FIG. 6. It shows the A, B, C, and D input signals to the encoder 418, and the high (H) and low (L) input signal combinations necessary to provide the necessary or required high (H) and low (L) output signal noted as Priority On.

What has been shown and described is a priority requestor accelerator that detects the fact that one remaining requestor is in the priority system. Thus, the priority logic is cleared out a period before the end of the normal requestor cycle. This early removal of these prior requests allows the acceptance of a new set of requestors to be presented to the priority circuits at the normal switching time. Without this feature an entire memory cycle would be lost since presentation of the new requests cannot occur concurrently with the clearing of the previous requests. By this early detection of termination and preclearing of the priority register, there is a smooth transition, without memory cycle loss, between request groups.

While the foregoing description describes a specific embodiment of this accelerator, it should be understood that it is within the scope of this invention to provide for other configurations of this early detection and clearing concept.

Further modifications of the invention falling within the scope of the appended claims, will be obvious to those skilled in the art to which this invention pertains. The embodiments of the invention in which an exclusive property or privilege are claimed is defined as follows.

What is claimed is:

1. A system for accelerating the granting of prioritized memory requests made to a multiport memory system of a digital data processing system having a plurality of processors comprising:
   (a) a request register coupled to said plurality of processors of the digital data processing system to receive memory access requests from said plurality of processors;

(b) a latching network coupled to said request register, said latching network including enabling/disabling means for simultaneously allowing the transfer of the entire contents of said request register, in a snapshot fashion, when said enabling/disabling means is enabled and for preventing the entrance of any further transfers from said request register when said enabling/disabling means is disabled;

(c) a priority encoder connected to said latching network to prioritize said requests;

(d) a priority register connected to said priority encoder to provide a plurality of prioritized requests to said multiport memory system;

(e) acceleration means further coupled to said request register and to said latching network, said acceleration means including logic circuit means to detect and indicate when only one pending memory request remains in said latching means by providing an output enabling signal; and (f) means coupled between said acceleration means, said latching network and said request register to couple said output enabling signal from said acceleration means to said latching network and to said request register via said enabling/disabling means and thereby allow a new plurality of memory requests to simultaneously enter said latching network, in a snapshot fashion, before said only one pending memory request has been granted access whereby an acceleration system is provided which grants successive pluralities of prioritized memory requests made to a multiport memory system of a digital data processing system without a time delay occurring between the satisfaction of the last request of a previous plurality of memory requests and the receipt of a new plurality of such requests.

2. A priority requestor accelerator for increasing the request rate of priority logic circuits, such as are normally used to determine the sequential order in which memory requests are granted from various requestors in a data processing system comprising:

(a) request latching means with enabling/disabling means connected to the various requestors of said data processing system to simultaneously receive and store a plurality of memory requests upon activation of said enabling means and to prevent such reception and storage of said memory requests upon activation of said disabling means;

(b) priority encoder/decoder means coupled to said request latching means to sequentially satisfy the plurality of memory requests in a prioritized manner;

(c) priority request acceleration means coupled to said request latching means for detecting when one memory request remains in said request latching means and of providing an enabling output signal upon such detection; and (d) coupling means connected between said priority request acceleration means and the enabling means of said request latching means to enable said request latching means, upon the detection of one memory request remaining in said request latching means, and by such enabling cause the request latching means to simultaneously receive and store another plurality of memory requests whereby a priority requestor accelerator is provided which increases the request rate in which memory requests are granted by eliminating the delay which occurs between the granting of the last memory request of a previous plurality of such requests and the simultaneous reception of the next plurality of memory requests.

3. The invention as set forth in claim 2 wherein said request latchng means includes a plurality of bistable devices each having an enabling and a disabling means, said enabling means of each bistable device being commonly connected together to provide a single enabling means to said request latching means, and said disabling means of each bistable device being commonly connected together to provide a single disabling means to said request latching means whereby a single enabling signal enables all of the bistable device of the request latching means and a single disabling means disables all of the bistable devices of the request latching means.

4. The inention as set forth in claim 3 wherein said request latching means includes a memory request register coupled between the plurality of input request signals entering the data processing system and the plurality of bistable devices, which request register receives and temporarily stores each of the input memory request signals until all of the said plurality of bistable devices are simultaneously enabled to allow the memory request signals to concurrently enter the plurality of bistable devices.

5. The invention as set forth in claim 2 wherein said priority request acceleration means comprises a plurality of AND gates coupled to receive a plurality of prioritized input signals, each AND gate connected to receive various combinations of the prioritized input signals, a single OR gate, the input of which is commonly coupled directly to the outputs of all of said plurality of AND gates and a latching means coupled to the output of said OR gate whereby said latching means will provide an enabling signal to said request latching means to allow the loading of the next group of memory requests when one of the prioritized input signal is present.

6. The invention as set forth in claim 5 wherein the latching means within said priority request acceleration means includes an enabling input means which is coupled to receive a clock input signal, said enabling input means to be activated upon the arrival of the fourth clock cycle of an eight clock cycle system.

* * * * *